US012544086B2

(12) United States Patent
Prince (10) Patent No.: US 12,544,086 B2
(45) Date of Patent: Feb. 10, 2026

(54) SYSTEMS AND METHODS FOR PREVENTING OR TREATING VASCULAR ACCESS DEVICE-RELATED THROMBOSIS (71) Applicant: Bard Access Systems, Inc., Salt Lake City, UT (US)

(72) Inventor: Matthew J. Prince, Herriman, UT (US)

(73) Assignee: Bard Access Systems, Inc., Salt Lake City, UT (US)

( * ) Notice: Subject to any disclaimer, the term of this patent is extended or adjusted under 35 U.S.C. 154(b) by 0 days.

(21) Appl. No.: 18/388,064

(22) Filed: Nov. 8, 2023

(65) Prior Publication Data
US 2024/0148396 A1 May 9, 2024

Related U.S. Application Data (60) Provisional application No. 63/424,000, filed on Nov. 9, 2022.

(51) Int. Cl.
A61B 17/225 (2006.01)
A61B 17/00 (2006.01)
A61B 90/00 (2016.01)
A61M 25/00 (2006.01)
A61M 39/02 (2006.01)

(52) U.S. Cl.
CPC ............ A61B 17/2255 (2013.01); A61B 2017/00199 (2013.01); A61B 2017/00951 (2013.01); A61B 2090/378 (2016.02); A61M 2025/0019 (2013.01); A61M 2039/0258 (2013.01)

(58) Field of Classification Search
CPC ...... A61B 17/2255; A61B 2017/00199; A61B 2017/00951; A61B 2090/378
See application file for complete search history.

(56) References Cited

U.S. PATENT DOCUMENTS 3,433,226 A 3/1969 Boyd
4,509,947 A 4/1985 Lattin
4,698,058 A 10/1987 Greenfeld et al.
4,723,946 A 2/1988 Kay
(Continued)

FOREIGN PATENT DOCUMENTS

CN 216676744 U 6/2022
EP 3552552 A1 10/2019
(Continued)

OTHER PUBLICATIONS

EP 20882883.0 filed May 12, 2022 Extended European Search Report dated Feb. 8, 2024.
(Continued)

Primary Examiner — Baisakhi Roy
(74) Attorney, Agent, or Firm — Rutan & Tucker LLP (57) ABSTRACT A system for preventing or treating vascular access device ("VAD")-related thrombosis can include an ultrasound transducer configured to emit thrombus-fragmenting ultrasound into a patient about a VAD. The ultrasound transducer can include a securing means for securing the ultrasound transducer to the patient over the VAD. A method of such a system can include an ultrasound-emitting step. The ultrasound-emitting step can include emitting thrombus-fragmenting ultrasound from the ultrasound transducer into the patient about the VAD.

17 Claims, 6 Drawing Sheets

(56) References Cited

U.S. PATENT DOCUMENTS

| | | |
|---|---|---|
| 4,955,862 A | 9/1990 | Sepetka |
| 5,092,844 A | 3/1992 | Schwartz et al. |
| 5,135,482 A | 8/1992 | Neracher |
| 5,188,618 A | 2/1993 | Thomas |
| 5,318,518 A | 6/1994 | Plechinger et al. |
| 5,512,048 A | 4/1996 | Slettenmark |
| 5,643,229 A | 7/1997 | Sinaiko |
| 5,681,339 A | 10/1997 | McEwen et al. |
| 5,730,806 A | 3/1998 | Caimi et al. |
| 5,741,244 A | 4/1998 | Klaas |
| 5,980,529 A | 11/1999 | Strukel |
| 6,015,414 A | 1/2000 | Werp et al. |
| 6,027,572 A | 2/2000 | Labib et al. |
| 6,044,855 A | 4/2000 | Monch |
| 6,149,596 A | 11/2000 | Bancroft |
| 6,183,450 B1 | 2/2001 | Lois |
| 6,283,719 B1 | 9/2001 | Frantz et al. |
| 6,423,266 B1 | 7/2002 | Choperena et al. |
| 6,585,934 B1 | 7/2003 | Oberleitner et al. |
| 6,681,783 B2 | 1/2004 | Kawazoe |
| 6,699,331 B1 | 3/2004 | Kritzler |
| 6,805,684 B2 | 10/2004 | Bonnette et al. |
| 6,958,056 B2 | 10/2005 | Kadziauskas et al. |
| 7,005,012 B2 | 2/2006 | Bourrelly et al. |
| 7,179,269 B2 | 2/2007 | Welch et al. |
| 7,393,501 B2 | 7/2008 | Zumeris et al. |
| 7,494,484 B2 | 2/2009 | Beck et al. |
| 7,654,996 B2 | 2/2010 | Lynn |
| 7,669,600 B2 | 3/2010 | Morejon |
| 7,763,010 B2 | 7/2010 | Evans et al. |
| 7,775,215 B2 | 8/2010 | Hassler, Jr. et al. |
| 7,775,966 B2 | 8/2010 | Dlugos et al. |
| 7,794,407 B2 | 9/2010 | Rothenberg |
| 7,829,029 B2 | 11/2010 | Zumeris et al. |
| 7,833,239 B2 | 11/2010 | Nash |
| 7,854,728 B2 | 12/2010 | Boyle, Jr. |
| 7,901,373 B2 | 3/2011 | Tavger |
| 8,177,919 B2 | 5/2012 | Efinger et al. |
| 8,246,752 B2 | 8/2012 | Boyle, Jr. |
| 8,394,068 B2 | 3/2013 | Kosinski et al. |
| 8,435,225 B2 | 5/2013 | Courtney et al. |
| 8,506,512 B2 | 8/2013 | Aklog et al. |
| 8,672,917 B2 | 3/2014 | Sigg et al. |
| 8,734,345 B2 | 5/2014 | Deshpande et al. |
| 8,741,069 B2 | 6/2014 | Meyer |
| 8,881,752 B1 | 11/2014 | Fonteyn |
| 8,943,633 B2 | 2/2015 | Soh et al. |
| 8,999,074 B2 | 4/2015 | Zachar et al. |
| 9,060,804 B2 | 6/2015 | Meyer |
| 9,095,286 B2 | 8/2015 | Vazales et al. |
| 9,254,371 B2 | 2/2016 | Martin et al. |
| 9,308,348 B2 | 4/2016 | Mulvihill et al. |
| 9,332,998 B2 | 5/2016 | Ray et al. |
| 9,532,844 B2 | 1/2017 | Garvey et al. |
| 9,707,325 B2 | 7/2017 | Deeds |
| 9,789,227 B1 | 10/2017 | El-Hennawy et al. |
| 9,848,904 B2 | 12/2017 | Aljuri et al. |
| 10,188,816 B2 | 1/2019 | Khosrowshahi et al. |
| 10,188,831 B2 | 1/2019 | Elberse et al. |
| 10,272,260 B2 | 4/2019 | Kaplan et al. |
| 11,020,572 B2 | 6/2021 | Chappel et al. |
| 11,684,341 B1* | 6/2023 | Moss, Jr. ............... A61B 8/565 600/437 |
| 2002/0111579 A1 | 8/2002 | Moutafis et al. |
| 2003/0109837 A1 | 6/2003 | Mcbride-Sakal |
| 2003/0163147 A1* | 8/2003 | Rabiner ............ A61B 17/22012 606/159 |
| 2004/0073115 A1 | 4/2004 | Horzewski et al. |
| 2005/0096607 A1 | 5/2005 | Beck |
| 2006/0100568 A1* | 5/2006 | Tan .................... A61L 31/10 604/93.01 |
| 2006/0241459 A1* | 10/2006 | Tai ..................... A61B 8/0808 600/437 |
| 2006/0241522 A1 | 10/2006 | Chandraratna |
| 2007/0179513 A1 | 8/2007 | Deutsch |
| 2007/0213645 A1 | 9/2007 | Zumeris et al. |
| 2008/0097206 A1* | 4/2008 | Chomas ................. A61B 8/481 600/439 |
| 2008/0097232 A1 | 4/2008 | Rothenberg |
| 2008/0267688 A1 | 10/2008 | Busted |
| 2009/0107529 A1 | 4/2009 | Lin et al. |
| 2010/0204712 A1 | 8/2010 | Mallaby |
| 2010/0312084 A1 | 12/2010 | Radojicic |
| 2011/0004198 A1 | 1/2011 | Hoch |
| 2011/0105845 A1 | 5/2011 | Gordon et al. |
| 2011/0112564 A1 | 5/2011 | Wolf |
| 2011/0144540 A1 | 6/2011 | Shen et al. |
| 2011/0257593 A1 | 10/2011 | Kalpin et al. |
| 2013/0190701 A1 | 7/2013 | Kirn |
| 2014/0102445 A1 | 4/2014 | Clement et al. |
| 2014/0150782 A1 | 6/2014 | Vazales et al. |
| 2014/0200554 A1 | 7/2014 | Mtullo et al. |
| 2014/0243789 A1 | 8/2014 | Mehta et al. |
| 2014/0257244 A1 | 9/2014 | Johnston et al. |
| 2014/0371725 A1 | 12/2014 | Karimov et al. |
| 2015/0080762 A1 | 3/2015 | Kassab et al. |
| 2015/0231361 A1 | 8/2015 | O'Keefe et al. |
| 2015/0282821 A1 | 10/2015 | Look et al. |
| 2015/0297176 A1 | 10/2015 | Rincker et al. |
| 2015/0305819 A1 | 10/2015 | Krause |
| 2015/0314074 A1 | 11/2015 | Howlett et al. |
| 2015/0343182 A1 | 12/2015 | Vazales et al. |
| 2015/0374401 A1 | 12/2015 | Guggenheimer et al. |
| 2016/0175065 A1 | 6/2016 | Gomez et al. |
| 2016/0175560 A1 | 6/2016 | Tallarida et al. |
| 2017/0106128 A1 | 4/2017 | Bagwell et al. |
| 2017/0143880 A1 | 5/2017 | Luxon et al. |
| 2017/0265879 A1 | 9/2017 | Washburn, II et al. |
| 2017/0312548 A1 | 11/2017 | Patil et al. |
| 2017/0354777 A1 | 12/2017 | Ofek et al. |
| 2018/0001114 A1* | 1/2018 | Li .......................... A61N 7/00 |
| 2018/0168668 A1 | 6/2018 | Zheng |
| 2019/0240472 A1 | 8/2019 | Makey |
| 2019/0290838 A1 | 9/2019 | Ofek et al. |
| 2020/0022777 A1 | 1/2020 | Rama |
| 2020/0155003 A1 | 5/2020 | Mitchell et al. |
| 2020/0205845 A1 | 7/2020 | Yang et al. |
| 2021/0077714 A1 | 3/2021 | Bodner |
| 2021/0128869 A1* | 5/2021 | Davis ...................... A61M 1/77 |
| 2021/0369240 A1* | 12/2021 | Moss, Jr. ............. G09B 23/303 |
| 2021/0378593 A1 | 12/2021 | Ofek et al. |
| 2022/0142661 A1* | 5/2022 | McLaughlin .......... A61B 90/70 |
| 2023/0001662 A1 | 1/2023 | De Souza Neto et al. |
| 2024/0408348 A1 | 12/2024 | Ahmed et al. |

FOREIGN PATENT DOCUMENTS

| | | |
|---|---|---|
| EP | 3668411 B1 | 1/2021 |
| WO | 2006071855 A2 | 7/2006 |
| WO | 2007110870 A2 | 10/2007 |
| WO | 2008097993 A2 | 8/2008 |
| WO | 17214120 A1 | 12/2017 |
| WO | 2019098279 A1 | 5/2019 |
| WO | 2021086569 A1 | 5/2021 |
| WO | 2023288005 A1 | 1/2023 |
| WO | 2024096882 A1 | 5/2024 |
| WO | 2024102408 A1 | 5/2024 |
| WO | 2024254335 A1 | 12/2024 |

OTHER PUBLICATIONS

Gil, B., Li, B., Gao, A., & Yang, G. Z. (2020). Miniaturized piezo force sensor for a medical catheter and implantable device. ACS applied electronic materials, 2(8), 2669-2677.

PCT/US20/54757 filed Oct. 8, 2020 International Search Report and Written Opinion dated Feb. 17, 2021.

PCT/US2023/037024 filed Nov. 8, 2023 International Search Report and Written Opinion dated Feb. 22, 2024.

U.S. Appl. No. 17/065,941, filed Oct. 8, 2020 Advisory Action dated Dec. 6, 2023.

U.S. Appl. No. 17/065,941, filed Oct. 8, 2020 Advisory Action dated May 5, 2023.

(56) References Cited

OTHER PUBLICATIONS

U.S. Appl. No. 17/065,941, filed Oct. 8, 2020 Final Office Action dated Jan. 12, 2023.
U.S. Appl. No. 17/065,941, filed Oct. 8, 2020 Final Office Action dated Jun. 5, 2024.
U.S. Appl. No. 17/065,941, filed Oct. 8, 2020 Final Office Action dated Sep. 25, 2023.
U.S. Appl. No. 17/065,941, filed Oct. 8, 2020 Non-Final Office Action dated Jan. 31, 2024.
U.S. Appl. No. 17/065,941, filed Oct. 8, 2020 Non-Final Office Action dated May 31, 2023.
U.S. Appl. No. 17/065,941, filed Oct. 8, 2020 Non-Final Office Action dated Oct. 21, 2022.
PCT/US2022/037175 filed Jul. 14, 2022, International Search Report and Written Opinion dated Jan. 9, 2023.
PCT/US2022/048969 filed Nov. 4, 2022 International Search Report and Written Opinion dated May 8, 2023.
PCT/US2023/032853 filed Jun. 6, 2024 International Search Report and Written Opinion dated Oct. 1, 2024.
PCT/US2023/037024 filed Nov. 8, 2023 International Preliminary Report on Patentability dated Apr. 29, 2025.
U.S. Appl. No. 17/065,941, filed Oct. 8, 2020 Examiner's Answer dated Dec. 20, 2024.
U.S. Appl. No. 17/865,146, filed Jul. 14, 2022 Restriction Requirement dated May 19, 2025.
U.S. Appl. No. 17/865,146 filed Jul. 14, 2022 Non-Final Office Action dated Jul. 30, 2025.

* cited by examiner

SYSTEMS AND METHODS FOR PREVENTING OR TREATING VASCULAR ACCESS DEVICE-RELATED THROMBOSIS

PRIORITY

This application claims the benefit of priority to U.S. Provisional Application No. 63/424,000, filed Nov. 9, 2022, which is incorporated by reference in its entirety into this application.

BACKGROUND

Maintaining patency of a vascular access device ("VAD") such as a central venous catheter can be challenging among various patient-, VAD-, and treatment-related factors. Indeed, a thrombus including an intraluminal clot can easily form within a VAD such as within an end or tip of the VAD, a thrombus including a mural or occlusive thrombus can easily form around a VAD such as around an end or tip of the VAD, or a combination of the foregoing, thereby requiring intervention. For this reason, blood thinners are often recommended for a duration of VAD use. However, blood thinners can be contraindicated in some patients, and blood thinners are prophylactic in that they generally do not fragment any thrombi that stubbornly form in spite of the blood thinners. Clearly, maintaining patency of VADs is important for minimizing therapeutic interruptions, particularly those interruptions associated with replacing even partially occluded VADs, which increase costs of care. As such, systems and methods are needed for extending VAD life and increasing therapeutic outcomes.

Disclosed herein are systems and methods for preventing or treating VAD-related thrombosis.

SUMMARY

Disclosed herein is a system for preventing or treating VAD-related thrombosis. The system includes, in some embodiments, an ultrasound transducer configured to emit thrombus-fragmenting ultrasound into a patient about a VAD. The ultrasound transducer includes a securing means for securing the ultrasound transducer to the patient over the VAD.

In some embodiments, the securing means is an adhesive. The adhesive is configured to adhere the ultrasound transducer to skin of the patient and hold the ultrasound transducer in place over the VAD.

In some embodiments, the securing means includes a strap. The strap is configured to wrap around a trunk, an appendage, or neck of the patient and hold the ultrasound transducer in place over the VAD.

In some embodiments, the securing means includes a clip. The clip is configured to clip around a trunk, an appendage, or neck of the patient and hold the ultrasound transducer in place over the VAD.

In some embodiments, the system further includes a console operably coupled to the ultrasound transducer. The console includes one or more processors and memory including instructions configured to instantiate one or more processes when executed by the one-or-more processors. The one-or-more processes are configured to implement i) a pre-programmed ultrasound emission profile or ii) a custom ultrasound emission profile based upon diagnostic data for the preventing or treating of VAD-related thrombosis.

In some embodiments, the pre-programmed or custom ultrasound emission profile includes one or more periods of continuous ultrasound emission, one or more periods of pulsed ultrasound emission, a constant ultrasound power level, one or more different ultrasound power levels, a constant ultrasound frequency, one or more different ultrasound frequencies, or a combination thereof.

In some embodiments, the diagnostic data includes ultrasound-imaging data.

In some embodiments, the ultrasound transducer doubles as an ultrasound probe.

In some embodiments, the system further includes a display screen optionally integrated into the console. The display screen is configured to display ultrasound images including at least a blood vessel of the patient in which the VAD is disposed.

In some embodiments, the VAD is a catheter.

In some embodiments, the VAD is a port.

In some embodiments, the VAD is an arteriovenous graft.

Also disclosed herein is a method of a system for preventing or treating VAD-related thrombosis. The method includes, in some embodiments, an ultrasound-emitting step. The ultrasound-emitting step includes emitting thrombus-fragmenting ultrasound from an ultrasound transducer into a patient about a VAD. The ultrasound transducer includes a securing means for securing the ultrasound transducer to the patient over the VAD.

In some embodiments, the securing means is an adhesive. The adhesive adheres the ultrasound transducer to skin of the patient and holds the ultrasound transducer in place over the VAD.

In some embodiments, the securing means includes a strap. The strap wraps around a trunk, an appendage, or neck of the patient and holds the ultrasound transducer in place over the VAD.

In some embodiments, the securing means includes a clip. The clip clips around a trunk, an appendage, or neck of the patient and holds the ultrasound transducer in place over the VAD.

In some embodiments, the method further includes an instantiating step and an emission profile-implementing step. The instantiating step includes instantiating one or more processes upon execution of instructions stored in memory of a console by one or more processors of the console. The console is operably coupled to the ultrasound transducer. The emission profile-implementing step includes implementing in accordance with the one-or-more processes i) a pre-programmed ultrasound emission profile or ii) a custom ultrasound emission profile based upon diagnostic data for the preventing or treating of VAD-related thrombosis.

In some embodiments, the pre-programmed or custom ultrasound emission profile includes one or more periods of continuous ultrasound emission, one or more periods of pulsed ultrasound emission, a constant ultrasound power level, one or more different ultrasound power levels, a constant ultrasound frequency, one or more different ultrasound frequencies, or a combination thereof.

In some embodiments, the diagnostic data includes ultrasound-imaging data.

In some embodiments, the method further includes a scanning step. The scanning step includes sending emitted ultrasound signals into the patient about the VAD; receiving echoed ultrasound signals from the patient; and processing the echoed ultrasound signals into the ultrasound-imaging data. The ultrasound transducer doubles as an ultrasound probe.

In some embodiments, the method further includes a displaying step. The displaying step includes displaying ultrasound images on a display screen optionally integrated into the console. The ultrasound images include at least a blood vessel of the patient in which the VAD is disposed.

In some embodiments, the VAD is a catheter.

In some embodiments, the VAD is a port.

In some embodiments, the VAD is an arteriovenous graft.

These and other features of the concepts provided herein will become more apparent to those of skill in the art in view of the accompanying drawings and following description, which describe particular embodiments of such concepts in greater detail.

DESCRIPTION

Before some particular embodiments are disclosed in greater detail, it should be understood that the particular embodiments disclosed herein do not limit the scope of the concepts provided herein. It should also be understood that a particular embodiment disclosed herein can have features that can be readily separated from the particular embodiment and optionally combined with or substituted for features of any of a number of other embodiments disclosed herein.

Regarding terms used herein, it should also be understood the terms are for the purpose of describing some particular embodiments, and the terms do not limit the scope of the concepts provided herein. Ordinal numbers (e.g., first, second, third, etc.) are generally used to distinguish or identify different features or steps in a group of features or steps, and do not supply a serial or numerical limitation. For example, "first," "second," and "third" features or steps need not necessarily appear in that order, and the particular embodiments including such features or steps need not necessarily be limited to the three features or steps. In addition, any of the foregoing features or steps can, in turn, further include one or more features or steps unless indicated otherwise. Labels such as "left," "right," "top," "bottom," "front," "back," and the like are used for convenience and are not intended to imply, for example, any particular fixed location, orientation, or direction. Instead, such labels are used to reflect, for example, relative location, orientation, or directions. Singular forms of "a," "an," and "the" include plural references unless the context clearly dictates otherwise.

With respect to "proximal," a "proximal portion" or "proximal section" of, for example, a medical device such as the catheter 106 includes a portion or section of the medical device intended to be near a clinician when the medical device is used on a patient. Likewise, a "proximal length" of the medical device includes a length of the medical device intended to be near the clinician when the medical device is used on the patient. A "proximal end" of the medical device is an end of the medical device intended to be near the clinician when the medical device is used on the patient. The proximal portion, the proximal section, or the proximal length of the medical device can include the proximal end of the medical device, and, in such instances, the proximal portion, the proximal section, or the proximal length of the medical device can be further specified as a "proximal-end portion," a "proximal-end section," or a "proximal-end length" of the medical device. That said, the proximal portion, the proximal section, or the proximal length of the medical device need not include the proximal end of the medical device. Indeed, unless context suggests otherwise, the proximal portion, the proximal section, or the proximal length of the medical device is not a terminal portion, terminal section, or terminal length of the medical device.

With respect to "distal," a "distal portion" or "distal section" of, for example, a medical device such as the catheter 106 includes a portion or section of the medical device intended to be near or in a patient when the medical device is used on the patient. Likewise, a "distal length" of the medical device includes a length of the medical device intended to be near or in the patient when the medical device is used on the patient. A "distal end" of the medical device is an end of the medical device intended to be near or in the patient when the medical device is used on the patient. The distal portion, the distal section, or the distal length of the medical device can include the distal end of the medical device, and, in such instances, the distal portion, the distal section, or the distal length of the medical device can be further specified as a "distal-end portion," a "distal-end section," or a "distal-end length" of the medical device. That said, the distal portion, the distal section, or the distal length of the medical device need not include the distal end of the medical device. Indeed, unless context suggests otherwise, the distal portion, the distal section, or the distal length of the medical device is not a terminal portion, terminal section, or terminal length of the medical device.

Unless defined otherwise, all technical and scientific terms used herein have the same meaning as commonly understood by those of ordinary skill in the art.

Maintaining patency of a vascular access device ("VAD") such as a central venous catheter can be challenging among various patient-, VAD-, and treatment-related factors. Indeed, a thrombus including an intraluminal clot can easily form within a VAD such as within an end or tip of the VAD, a thrombus including a mural or occlusive thrombus can easily form around a VAD such as around an end or tip of the VAD, or a combination of the foregoing, thereby requiring intervention. For this reason, blood thinners are often recommended for a duration of VAD use. However, blood thinners can be contraindicated in some patients, and blood thinners are prophylactic in that they generally do not fragment any thrombi that stubbornly form in spite of the blood thinners. Clearly, maintaining patency of VADs is important for minimizing therapeutic interruptions, particularly those interruptions associated with replacing even partially occluded VADs, which increase costs of care. As such, systems and methods are needed for extending VAD life and increasing therapeutic outcomes.

Systems

Figure 1:
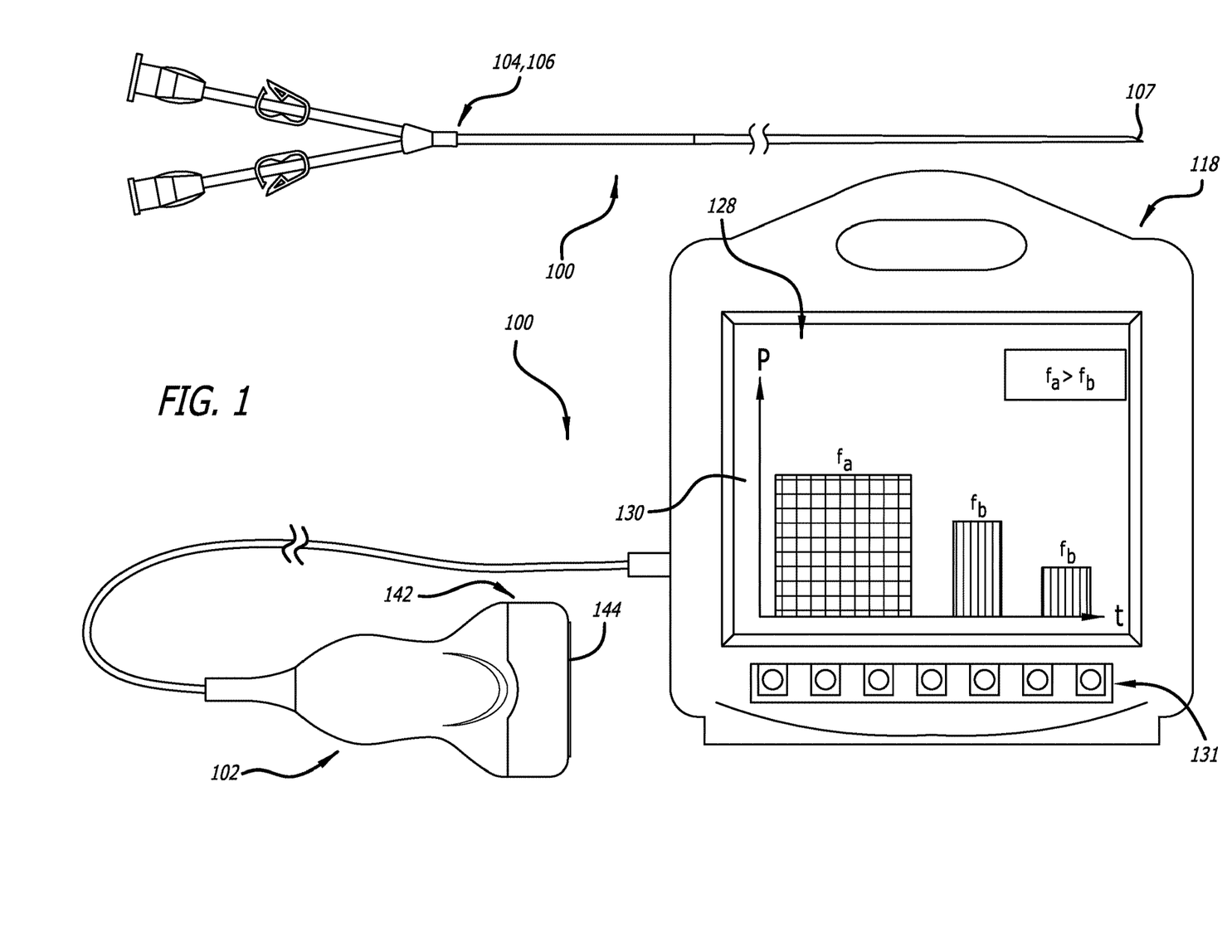
FIG. 1 illustrates a system for preventing or treating VAD-related thrombosis in accordance with some embodiments.

FIG. 1 illustrates a system 100 for preventing or treating VAD-related thrombosis in accordance with some embodiments.

As shown, the system 100 can include an ultrasound transducer 102 configured to emit thrombus-fragmenting ultrasound into a patient about a VAD 104 such as a catheter 106.

Figure 2:
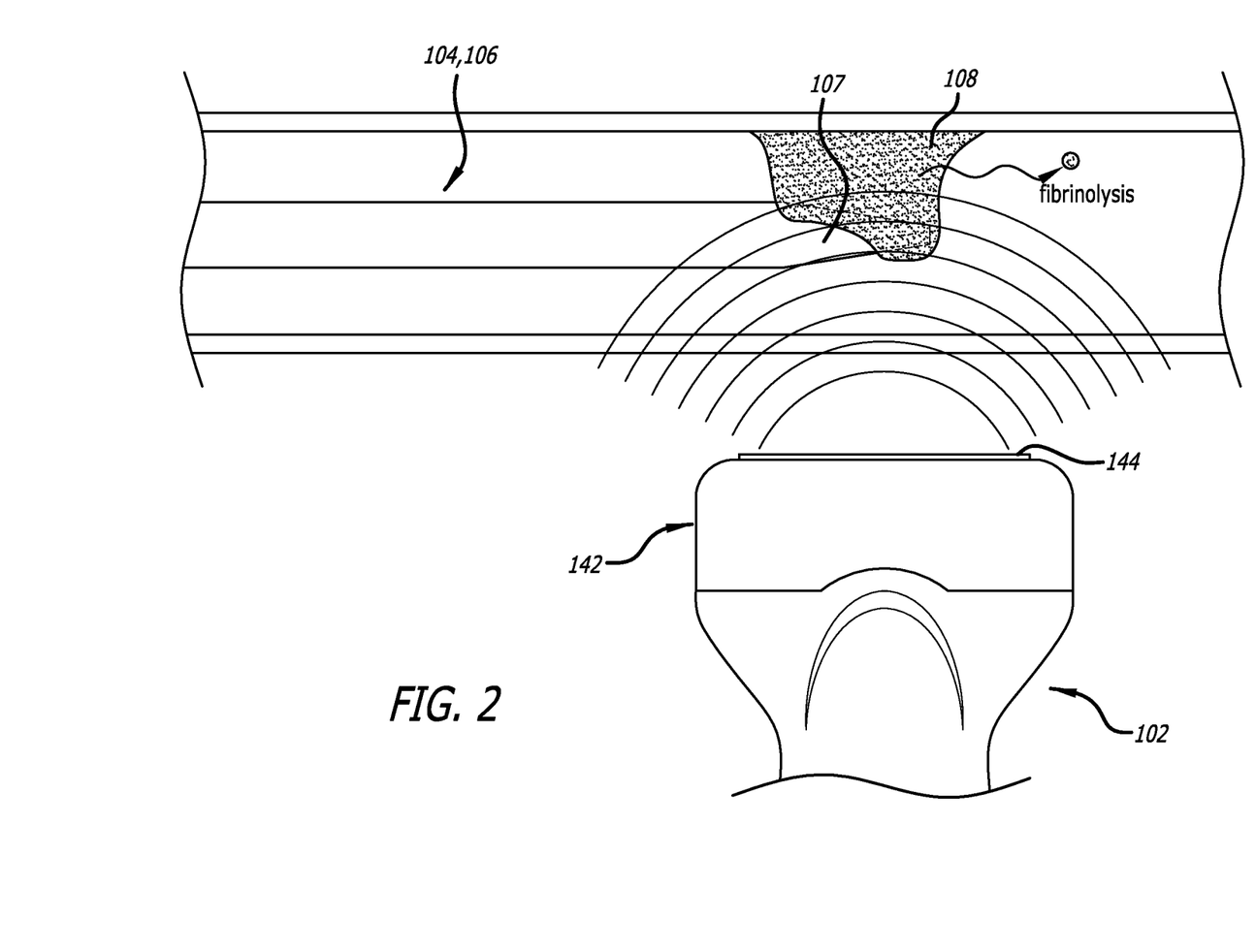
FIG. 2 illustrates fragmentation of a mural thrombus with thrombus-fragmenting ultrasound from an ultrasound transducer of the system in accordance with some embodiments.
Figure 3:
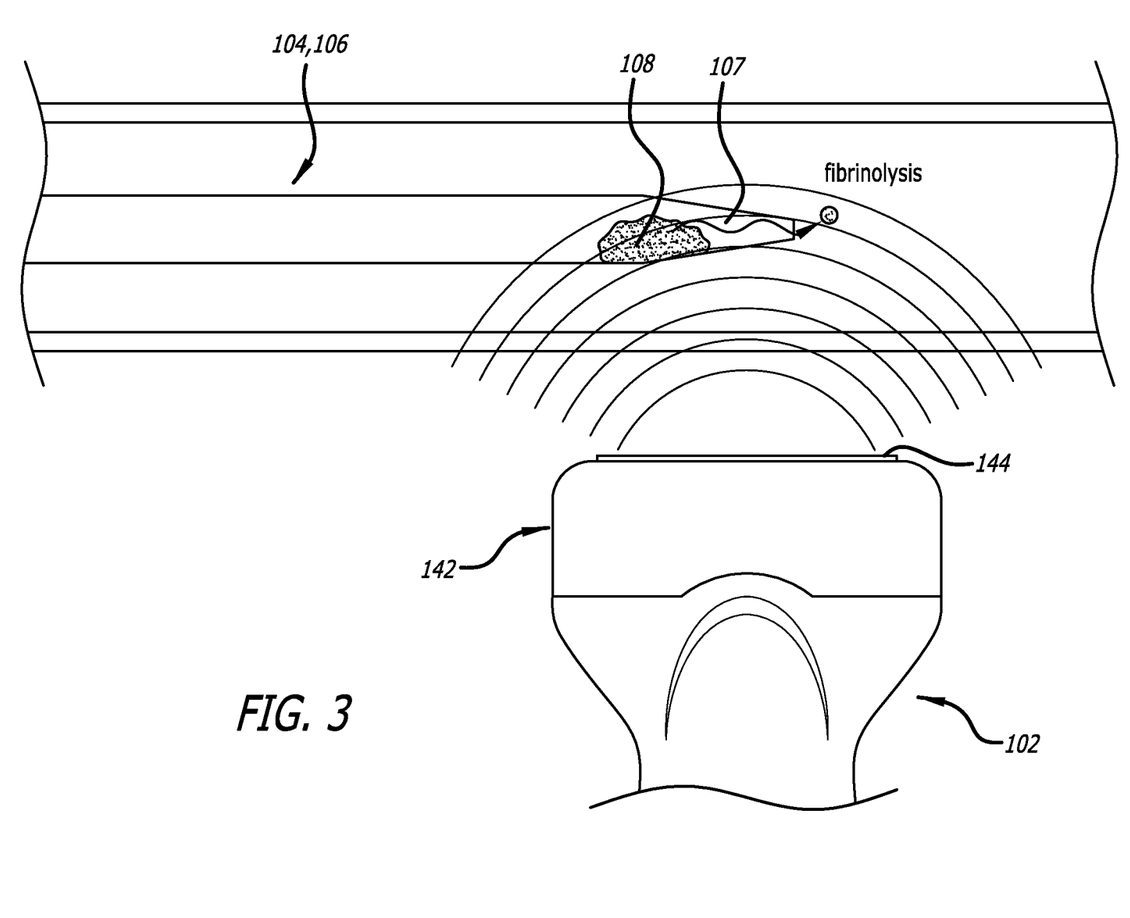
FIG. 3 illustrates fragmentation of an intraluminal thrombus with thrombus-fragmenting ultrasound from the ultrasound transducer of the system in accordance with some embodiments.

FIG. 2 illustrates fragmentation of a mural thrombus 108 with the thrombus-fragmenting ultrasound from the ultrasound transducer 102 of the system 100 in accordance with some embodiments. FIG. 3 illustrates fragmentation of an intraluminal thrombus 110 with the thrombus-fragmenting ultrasound from the ultrasound transducer 102 of the system 100 in accordance with some embodiments.

As shown, when the ultrasound transducer 102 is, for example, secured to the patient over the VAD 104, the ultrasound transducer 102 can emit the thrombus-fragmenting ultrasound into the patient about the VAD 104 to either prevent thrombus formation or fragment an existing thrombus by way of fibrinolysis. Indeed, the latter is shown in FIG. 2 by way of ultrasound-based fibrinolysis of the mural thrombus 108 occluding a tip 107 of the catheter 106. The latter is alternatively shown in FIG. 3 by way of ultrasound-based fibrinolysis of an intraluminal thrombus 110 occluding the tip 107 of the catheter 106.

Notably, while the catheter 106 is shown in FIGS. 1-3, it should be understood that the system 100 is not limited to the preventing or treating of VAD-related thrombosis in catheters. Indeed, the VAD 104 can alternatively be a port, an arteriovenous graft, or any of a number of other VADs. When the VAD 104 is a port, the preventing or treating of VAD-related thrombosis is typically in a stem of the port. And when the VAD 104 is an arteriovenous graft, the preventing or treating of VAD-related thrombosis is anywhere along a length of the arteriovenous graft, particularly in any length of the arteriovenous graft having a relatively tight radius.

Figure 4:
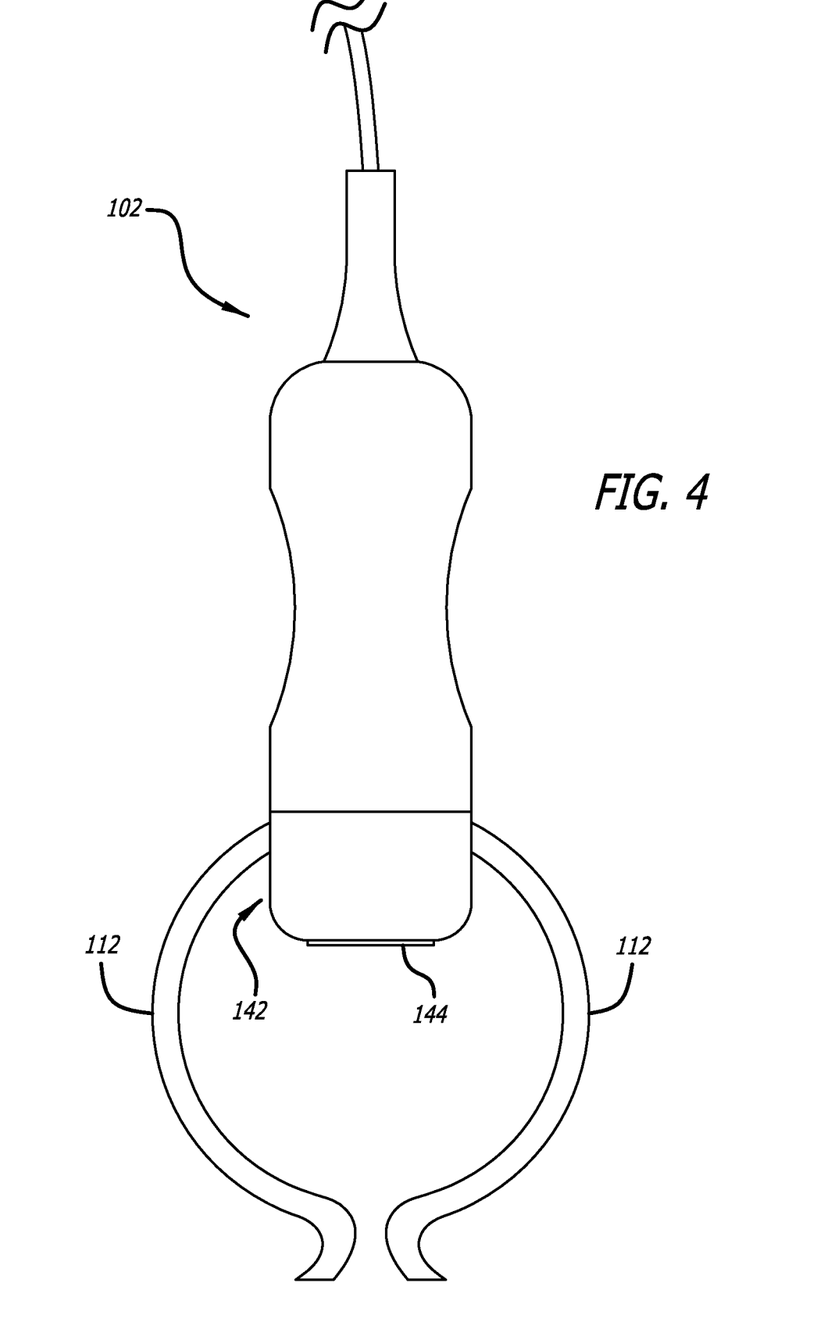
FIG. 4 illustrates a side view of the ultrasound transducer with a clip for clipping the ultrasound transducer to a patient in accordance with some embodiments.
Figure 5:
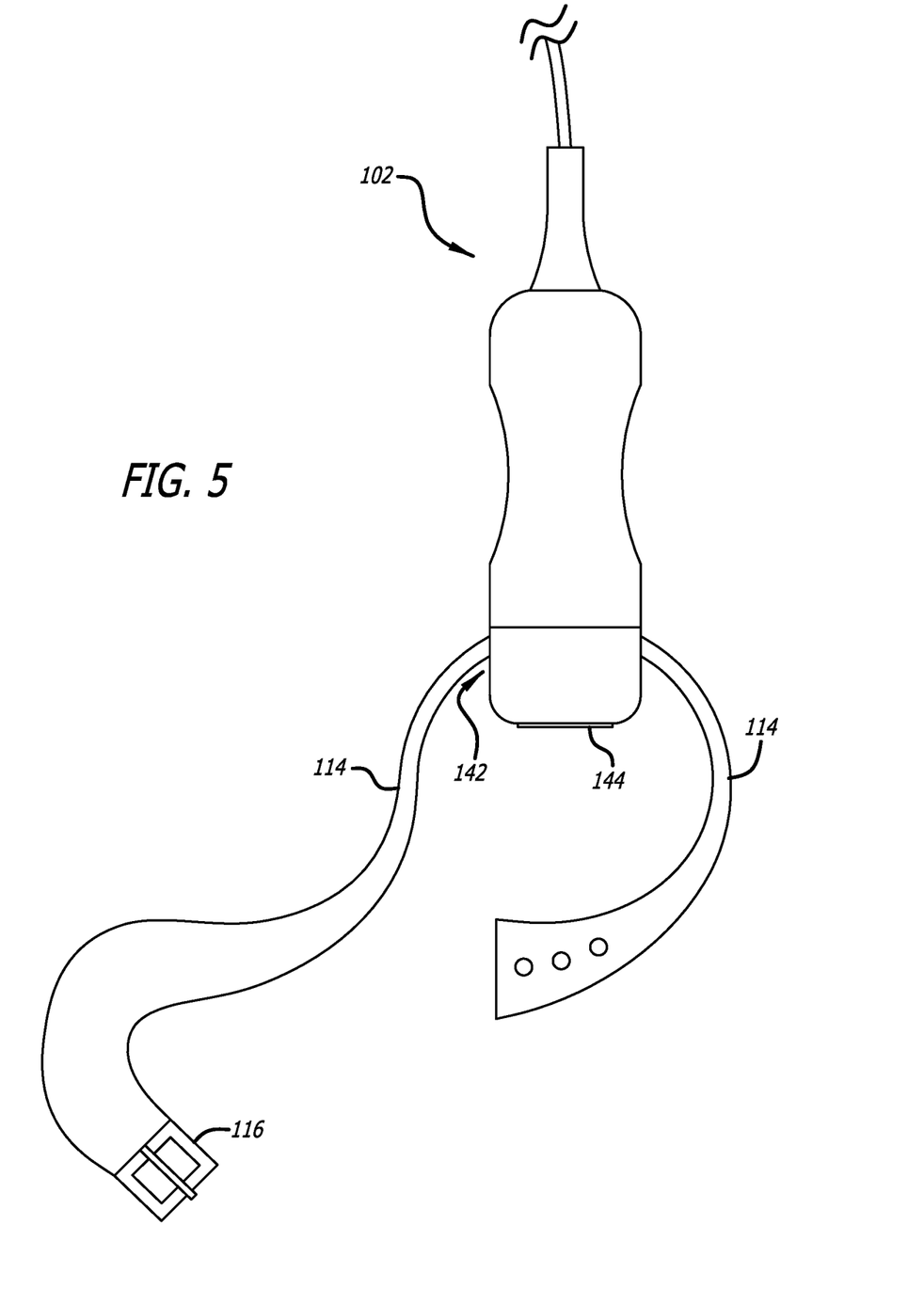
FIG. 5 illustrates a side view of the ultrasound transducer with a strap for strapping the ultrasound transducer to the patient in accordance with some embodiments.

FIG. 4 illustrates a side view of the ultrasound transducer 102 with a clip 112 for clipping the ultrasound transducer 102 to a patient in accordance with some embodiments. FIG. 5 illustrates a side view of the ultrasound transducer 102 with a strap 114 for strapping the ultrasound transducer 102 to the patient in accordance with some embodiments.

As shown, the ultrasound transducer 102 can include a securing means for securing the ultrasound transducer 102 to the patient over the VAD 104. Without limitation, such a securing means can include an adhesive, the clip 112 of FIG. 4, the strap 114 of FIG. 5, or the like. In an example, the securing means can be the foregoing adhesive, which can be configured to adhere the head 142 of the ultrasound transducer 102 to skin of the patient for holding the ultrasound transducer 102 in place over the VAD 104. In another example, the securing means can be the clip 112 of FIG. 4, which can be configured to clip around a trunk, an appendage, or a neck of the patient for holding the ultrasound transducer 102 in place over the VAD 104. In yet another example, the securing means can be the strap 114 of FIG. 5, which can be configured to wrap around the trunk, the appendage, or the neck of the patient for holding the ultrasound transducer 102 in place over the VAD 104. Such a strap 114 can be tied around the patient for holding the ultrasound transducer 102 in place over the VAD 104. Alternatively, the strap 114 can include a buckle 116 for buckling the strap 114 around the patient for holding the ultrasound transducer 102 in place over the VAD 104.

Figure 6:
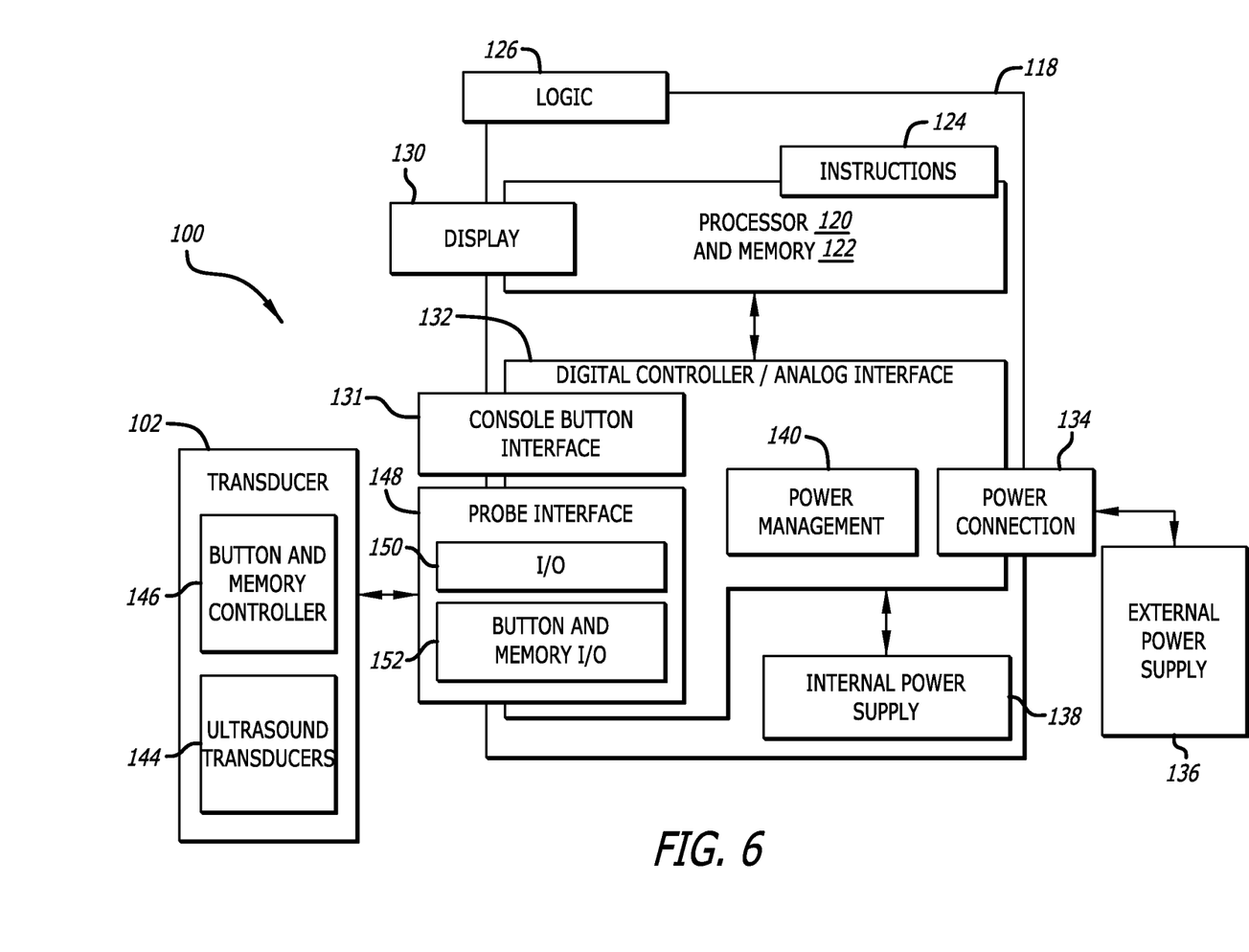
FIG. 6 illustrates a block diagram of the system for the preventing or treating of VAD-related thrombosis in accordance with some embodiments.

FIG. 6 illustrates a block diagram of the system 100 for the preventing or treating of VAD-related thrombosis in accordance with some embodiments.

As shown, the system 100 can further include a console 118 operably coupled to the ultrasound transducer 102.

The console 118 can include one or more processors 120 and memory 122 including instructions 124 stored thereon configured to instantiate one or more processes when executed by the one-or-more processors 120 for controlling various functions of the system 100. In an example, the one-or-more processes can include scanning with the ultrasound transducer 102 when the ultrasound transducer 102 is configured to double as an ultrasound probe. Such scanning can include sending emitted ultrasound signals into the patient about the VAD 104, receiving echoed ultrasound signals from the patient, and processing the echoed ultrasound signals into ultrasound-imaging data. In another example, the one-or-more processes can include automatically identifying any thrombi occluding the VAD 104 with logic 126 such as thrombi-identifying logic. In another example, the one-or-more processes can include fragmenting any thrombi in the VAD 104 in accordance with an ultrasound emission profile 128 such as a pre-programmed ultrasound emission profile or a custom ultrasound emission profile based upon any diagnostic data including, but not limited to, the ultrasound-imaging data. Notably, the ultrasound emission profile 128 can include one or more periods of continuous ultrasound emission, one or more periods of pulsed ultrasound emission, a constant ultrasound power level, one or more different ultrasound power levels, a constant ultrasound frequency, one or more different ultrasound frequencies, or a combination thereof, as needed for fragmenting any thrombi in the VAD 104. (See example ultrasound emission profile 128 of FIG. 1, which includes a short period of ultrasound emission including three different pulses over time t, each pulse at a different power level P and either a frequency $f_a$ or $f_b$ with $f_a > f_b$.)

The console 118 can further include a display screen 130 integrated therein; however, the display screen 130 can alternatively be separated from the console 118 and communicatively coupled thereto. The display screen 130 can be configured to provide a graphical user interface ("GUI") and display information thereon such as ultrasound images including at least a blood vessel of the patient in which the VAD 104 is disposed, optionally with any thrombi. In addition, such information can include the ultrasound emission profile 128 as shown in FIG. 1.

The console 118 can further include a console button interface 131 with one or more buttons configured to immediately call up to the display screen 130 one or more desired system modes such as a scanning mode for collecting ultrasound-imaging data for displaying the ultrasound images on the display screen 130, an identifying mode for automatically identifying any thrombi in the VAD 104 from the ultrasound images, or a fragmenting mode for fragmenting any thrombi in the VAD 104 in accordance with the ultrasound emission profile 128 (e.g., the pre-programmed or custom ultrasound emission profile).

The console 118 can further include a digital controller/analog interface 132 configured to communicate with the one-or-more processors 120, other components of the console 118, and other components of the system 100 such as the ultrasound transducer 102 to govern interfacing between the foregoing components.

The console 118 can further include a power connection 134 configured to enable an operable connection to an external power supply 136. Additionally or alternatively, the console 118 can include an internal power supply 138 (e.g., a battery). Whether or not the console 118 includes the internal power supply 138, the console 118 includes power management circuitry 140 with the digital controller/analog interface 132 for power regulation and distribution.

When the ultrasound transducer 102 is configured to double as an ultrasound probe, the system 100 is thereby configured for scanning for thrombi in the VAD 104 and, optionally, automatically identifying the thrombi as such with the thrombi-identifying logic. Advantageously, such a system 100 can be useful for confirming patency of the VAD 104 after fragmenting any thrombi in the VAD 104.

Whether or not the ultrasound transducer 102 is configured to double as an ultrasound probe, the ultrasound transducer 102 includes a head 142 that houses an array of ultrasound transducers 144, wherein the array of ultrasound transducers 144 includes piezoelectric transducers or capacitive micromachined ultrasound transducers ("CMUTs"). As set forth above, the head 142 of the ultrasound transducer 102 is configured to be placed against the skin of the patient and held in place over the VAD 104 with the securing means of the ultrasound transducer 102. In this way, the system 100, by way of the ultrasound transducer 102, can emit the thrombus-fragmenting ultrasound into the patient about the VAD 104 to either prevent thrombus formation or fragment an existing thrombus by way of fibrinolysis. And, when the ultrasound transducer 102 doubles as an ultrasound probe, the system 100 can further scan for thrombi in the VAD 104 and, optionally, automatically identify the thrombi as such with logic 126 such as the thrombi-identifying logic, as above. Notably, upon identification of any thrombi, the system 100 can automatically activate the array of ultrasound transducers 144 to fragment one or more thrombi by fibrinolysis.

The ultrasound transducer 102, particularly when doubling as an ultrasound probe operably connected to the console 118, can further include a button-and-memory controller 146 for governing button operation, as well as governing operation of the ultrasound transducer 102 itself. When present, the button-and-memory controller 146 is in operable communication with a probe interface 148 of the console 118, which includes an input/output ("I/O") component 150 for interfacing with the array of ultrasound transducers 144 and a button-and-memory I/O component 152 for interfacing with the button-and-memory controller 146.

Additionally or alternatively to that set forth above, the system 100 can be configured for preserving or even promoting blood-vessel health so as to maintain proper blood flow, reduce blood-vessel irritation, or the like. For example, if a VAD such as a PICC needs to be removed because the blood-vessels in which it is placed is no longer viable (not necessarily because of thrombosis), the system can be used to preserve remaining blood-vessel health and promote the blood-vessel health, optionally, for replacement of the PICC at a later date.

Methods

Methods include methods of the system 100 including a method for preventing or treating VAD-related thrombosis. Such a method can include one or more steps selected from an instantiating step; a scanning step, a displaying step, and identifying step, when the ultrasound transducer 102 doubles as an ultrasound probe; an emission profile-implementing step; and an ultrasound-emitting step.

The instantiating step can include instantiating the one-or-more processes set forth above upon execution of the instructions 124 stored in the memory 122 of the console 118 by the one-or-more processors 120 of the console 118.

The scanning step can include sending emitted ultrasound signals into the patient about the VAD 104, receiving echoed ultrasound signals from the patient, and processing the echoed ultrasound signals into the ultrasound-imaging data.

The displaying step can include displaying ultrasound images on the display screen 130 optionally integrated into the console 118. The ultrasound images can include at least a blood vessel of the patient in which the VAD 104 is disposed.

The identifying step can include automatically identifying any thrombi in the VAD 104 with the logic 126 such as the thrombi-identifying logic.

The ultrasound-emitting step can include emitting thrombus-fragmenting ultrasound from the ultrasound transducer 102 into the patient about the VAD 104.

The emission profile-implementing step can include implementing the ultrasound emission profile 128 for the preventing or treating of VAD-related thrombosis. Again, the ultrasound emission profile 128 can include the pre-programmed ultrasound emission profile or the custom ultrasound emission profile based upon diagnostic data such as the ultrasound-imaging data. As set forth above, the ultrasound emission profile 128 includes one or more periods of continuous ultrasound emission, one or more periods of pulsed ultrasound emission, a constant ultrasound power level, one or more different ultrasound power levels, a constant ultrasound frequency, one or more different ultrasound frequencies, or a combination thereof.

While some particular embodiments have been disclosed herein, and while the particular embodiments have been disclosed in some detail, it is not the intention for the particular embodiments to limit the scope of the concepts provided herein. Additional adaptations or modifications can appear to those of ordinary skill in the art, and, in broader aspects, these adaptations or modifications are encompassed as well. Accordingly, departures may be made from the particular embodiments disclosed herein without departing from the scope of the concepts provided herein.

What is claimed is:

1. A system for preventing or treating vascular access device ("VAD")-related thrombosis, comprising:
   an ultrasound transducer configured to emit thrombus-fragmenting ultrasound into a patient about a thrombus associated with a VAD, the thrombus formed within the VAD, around the VAD, or both within the VAD and around the VAD, and the ultrasound transducer including a securing means for securing the ultrasound transducer to the patient over the VAD; and
   a console operably coupled to the ultrasound transducer, the console including:
   a processor; and
   memory including instructions configured to instantiate a process when executed by the processor to implement a pre-programmed ultrasound emission profile for preventing or treating VAD-related thrombosis, wherein the pre-programmed ultrasound emission profile includes a period of continuous ultrasound emission, a period of pulsed ultrasound emission, a constant ultrasound power level, different ultrasound power levels, a constant ultrasound frequency, different ultrasound frequencies, or a combination thereof.

2. The system of claim 1, wherein the securing means is an adhesive configured to adhere the ultrasound transducer to skin of the patient and hold the ultrasound transducer in place over the VAD.

3. The system of claim 1, wherein the securing means includes a strap configured to wrap around a trunk, an appendage, or neck of the patient and hold the ultrasound transducer in place over the VAD.

4. The system of claim 1, wherein the securing means includes a clip configured to clip around a trunk, an appendage, or a neck of the patient and hold the ultrasound transducer in place over the VAD.

5. The system of claim 1, wherein the ultrasound transducer doubles as an ultrasound probe.

6. The system of claim 5, further comprising:
a display screen optionally integrated into the console, the display screen configured to display ultrasound images including at least a blood vessel of the patient in which the VAD is disposed.

7. The system of claim 1, wherein the VAD is selected from the group consisting of a catheter, a port, and an arteriovenous graft.

8. A method of a system for preventing or treating vascular access device ("VAD")-related thrombosis, comprising:
emitting thrombus-fragmenting ultrasound from an ultrasound transducer into a patient about a thrombus associated with a VAD, the thrombus formed within the VAD, around the VAD, or both within the VAD and around the VAD, and the ultrasound transducer including a securing means for securing the ultrasound transducer to the patient over the VAD;
instantiating a process upon execution of instructions stored in memory of a console by a processor of the console, the console operably coupled to the ultrasound transducer; and
implementing in accordance with the process i) a pre-programmed ultrasound emission profile or ii) a custom ultrasound emission profile based upon diagnostic data for preventing or treating VAD-related thrombosis, wherein the pre-programmed ultrasound emission profile or the custom ultrasound emission profile includes a period of continuous ultrasound emission, a period of pulsed ultrasound emission, a constant ultrasound power level, different ultrasound power levels, a constant ultrasound frequency, different ultrasound frequencies, or a combination thereof.

9. The method of claim 8, wherein the securing means is an adhesive adhering the ultrasound transducer to skin of the patient and holding the ultrasound transducer in place over the VAD.

10. The method of claim 8, wherein the securing means includes a strap or a clip around a trunk, an appendage, or a neck of the patient holding the ultrasound transducer in place over the VAD.

11. The method of claim 8, wherein the diagnostic data includes ultrasound-imaging data.

12. The method of claim 11, further comprising:
sending emitted ultrasound signals into the patient about the thrombus associated with the VAD;
receiving echoed ultrasound signals from the patient; and
processing the echoed ultrasound signals into the ultrasound-imaging data, the ultrasound transducer doubling as an ultrasound probe.

13. The method of claim 11, further comprising:
displaying ultrasound images on a display screen optionally integrated into the console, the ultrasound images including at least a blood vessel of the patient in which the VAD is disposed.

14. The method of claim 8, wherein the VAD is selected from the group consisting of a catheter, a port, and an arteriovenous graft.

15. A system for preventing or treating vascular access device ("VAD")-related thrombosis, comprising:
an ultrasound transducer configured to emit thrombus-fragmenting ultrasound into a patient about a thrombus associated with a VAD, the thrombus formed within the VAD, around the VAD, or both within the VAD and around the VAD, and the ultrasound transducer including a securing means for securing the ultrasound transducer to the patient over the VAD; and
a console operably coupled to the ultrasound transducer, the console including:
a processor; and
memory including instructions configured to instantiate a process when executed by the processor to implement a custom ultrasound emission profile based upon diagnostic data for preventing or treating VAD-related thrombosis, wherein the custom ultrasound emission profile includes a period of continuous ultrasound emission, a period of pulsed ultrasound emission, a constant ultrasound power level, different ultrasound power levels, a constant ultrasound frequency, different ultrasound frequencies, or a combination thereof.

16. The system of claim 15, wherein the ultrasound transducer doubles as an ultrasound probe, the diagnostic data including ultrasound-imaging data.

17. The system of claim 15, further comprising:
a display screen optionally integrated into the console, the display screen configured to display ultrasound images including at least a blood vessel of the patient in which the VAD is disposed.

* * * * *